US009092645B2

(12) United States Patent
Ozturk et al.

(10) Patent No.: US 9,092,645 B2
(45) Date of Patent: Jul. 28, 2015

(54) EFFICIENT MULTIPLICATION, EXPONENTIATION AND MODULAR REDUCTION IMPLEMENTATIONS

(75) Inventors: Erdinc Ozturk, Marlborough, MA (US); Vinodh Gopal, Westborough, MA (US); Gilbert M. Wolrich, Framingham, MA (US); Wajdi K. Feghali, Boston, MA (US); James D. Guilford, Northborough, MA (US); Deniz Karakoyunlu, Worcester, MA (US); Martin G. Dixon, Portland, OR (US); Kahraman D. Akdemir, Franklin, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/994,782

(22) PCT Filed: Dec. 5, 2011
(Under 37 CFR 1.47)

(86) PCT No.: PCT/US2011/063328
§ 371 (c)(1),
(2), (4) Date: Jun. 26, 2014

(87) PCT Pub. No.: WO2013/085487
PCT Pub. Date: Jun. 13, 2013

(65) Prior Publication Data
US 2015/0082047 A1    Mar. 19, 2015

(51) Int. Cl.
*H04L 29/00*    (2006.01)
*G06F 21/71*    (2013.01)
*H04L 9/30*    (2006.01)

(52) U.S. Cl.
CPC ............ *G06F 21/71* (2013.01); *H04L 9/3006* (2013.01)

(58) Field of Classification Search
CPC ............................ G06F 21/71; H04L 9/3006
USPC .................................................. 713/182, 183
See application file for complete search history.

(56) References Cited

U.S. PATENT DOCUMENTS

| 2008/0013715 A1 | 1/2008 | Feghali et al. |
| 2008/0144810 A1 | 6/2008 | Gopal et al. |
| 2009/0089617 A1 | 4/2009 | Gopal et al. |

OTHER PUBLICATIONS

International Search Report and Written Opinion received for PCT Application No. PCT/US2011/063328, mailed on Apr. 2, 2012, 10 pages.
Orman, "The Oakley Key Determination Protocol. Network Working Group", RFC 2412, Nov. 1998, 63 pages.

*Primary Examiner* — Jeffrey Pwu
*Assistant Examiner* — Michael D Anderson
(74) *Attorney, Agent, or Firm* — Grossman, Tucker, Perreault & Pfleger, PLLC

(57) ABSTRACT

In one embodiment, the present disclosure provides a method that includes segmenting an n-bit exponent e into a first segment $e_t$ and a number t of k-bit segments $e_i$ in response to a request to determine a modular exponentiation result R, wherein R is a modular exponentiation of a generator base g for the exponent e and a q-bit modulus m, wherein the generator base g equals two and k is based at least in part on a processor configured to determine the result R; iteratively determining a respective intermediate modular exponentiation result for each segment $e_i$, wherein the determining comprises multiplication, exponentiation and a modular reduction of at least one of a multiplication result and an exponentiation result; and generating the modular exponentiation result $R=g^e \mod m$ based on, at least in part, at least one respective intermediate modular exponentiation result.

20 Claims, 4 Drawing Sheets

500

```
Request to determine a modular exponentiation
result R = g^e mod m
502
```

```
Segmenting an n-bit exponent e into a first segment $e_t$ and a
number t of k-bit segments $e_i$ in response to the request,
wherein the generator base g equals two and k is based at least
in part on a processor configured to determine the result R
504
```

```
Iteratively calculating a respective intermediate modular
exponentiation result for each segment $e_i$, wherein the
calculating may include multiplication, exponentiation and a
modular reduction of at least one of a multiplication result and
an exponentiation result
506
```

```
Return a final result
508
```

FIG 5

EFFICIENT MULTIPLICATION, EXPONENTIATION AND MODULAR REDUCTION IMPLEMENTATIONS

FIELD

This disclosure relates to efficient implementation of multiplication, exponentiation and modular reduction.

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithms may be used to authenticate keys for encryption algorithms such as the Data Encryption Standard (DES) and Advanced Encryption Standard (AES).

RSA and DH provide security based on the use of number theory. RSA is based on factoring the product of two large prime numbers. DH is based on discrete logarithm for finite groups. Typically, public key systems use 1024-bit parameters for RSA and DH.

In protocols such as RSA or DH the main operation is a large modular exponentiation with operands in the range of 512 to 4096 bits (or higher for ultra-secure applications). In modular arithmetic, the result of an operation is a number (N) in the range between 0 and the modulus (M). A number N is congruent with X (mod Y), where N is the remainder after X is divided by Y, for example, if X=7 and Y=3. N=7 (mod 3)=1, that is, the remainder is 1 when 7 is divided by 3 so N=1 is congruent with 7 (mod 3).

Modular exponentiation algorithms may perform repeated modular squaring and/or multiplication operations, which include multiplication operations followed by modular reduction of the product. The modular reduction may be performed by a variety of techniques such as Montgomery reduction or Barrett's reduction.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

FIG. 5 illustrates a flowchart of exemplary operations consistent with an embodiment of the present disclosure.

Figure 1:
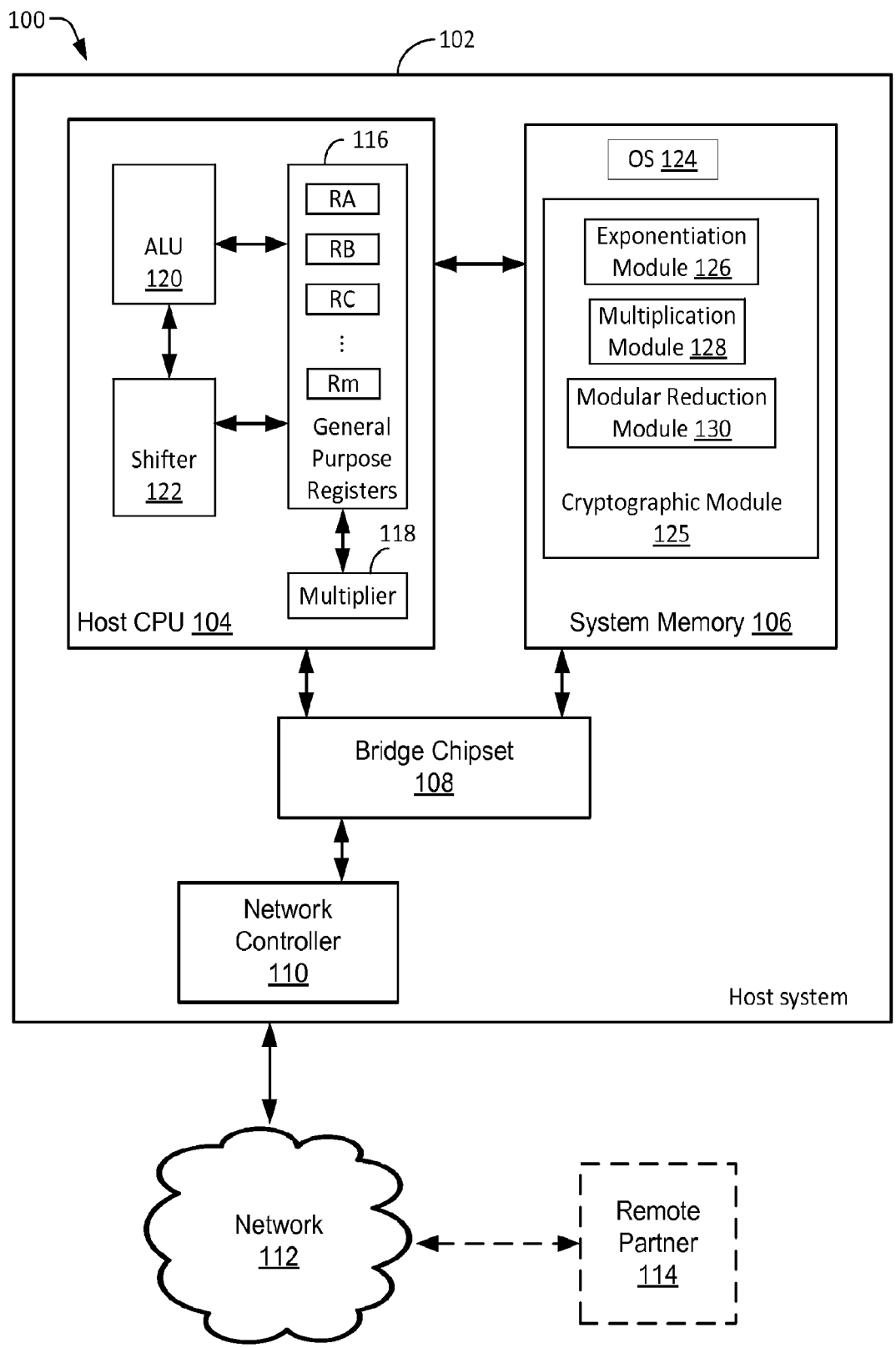
FIG. 1 illustrates a system consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure describes techniques for improving efficiency in modular exponentiation and modular multiplication operations on a p-bit processor that may be useful in cryptographic operations. The techniques are configured to exploit both processor architecture and properties of binary arithmetic operations to improve efficiency of modular exponentiation and modular multiplication.

Processors (and processor architecture) may be characterized by a bit capacity (or bit width) of the processor's general purpose registers (GPRs). For example, a p-bit processor may include a plurality of p-bit GPRs where each p-bit GPR is configured to store p-bits. Each of the plurality of p-bit GPRs may be configured to store an integer. "p" may further correspond to word length, bus width and/or addressing space.

Cryptographic operations typically include performing modular exponentiation on operands having bit lengths that are very large. For example, bit lengths may include hundreds (e.g., 512) or thousands (e.g., 1024) of bits. Because of the size of these operands, the operands are typically segmented and operations performed repeatedly (iteratively) on the segments to generate a result. Efficiency in performing these operations is therefore important. Efficiency may include speed that a cryptographic operation is performed, storage capacity for operands, coefficients and intermediate results and properties of circuitry used to perform the operations (e.g., multiplier dimensions).

A typical modular exponentiation operation (used, e.g., in cryptographic operations) may be defined as calculating:

$$R = g^e \bmod m$$

where g is a generator base, e is an exponent and the result R is the remainder of $g^e$ divided by the modulus m. Modular multiplication may be defined as R=A*B mod m where a multiplicand A is multiplied by a multiplier B, an intermediate result $R_1$=A*B and the result R is the remainder of A*B divided by the modulus m. Modular reduction corresponds to the remainder that results from an intermediate result divided by a modulus. The intermediate result may be a result of an exponentiation and/or multiplication.

Both modular exponentiation and modular multiplication are typically performed iteratively with each iteration performed on a portion (e.g., segment) of an operand. For example, an n-bit exponent e may be segmented into a number (e.g., t+1) of k-bit segments, $e_i$. The exponent may be represented as $e = (e_t e_{t-1} \ldots e_1 e_0)_b$ where base $b = 2^k$ and k is window size and corresponds to the number of bits in each segment $e_i$. In other words, $$e = e_t * (2^k)^t + e_{t-1} * (2^k)^{t-1} + \ldots + e_1 * (2^k) + e_0.$$

Each segment $e_i$ may be in the range of zero to $2^k-1$ ($0 \le e_i \le 2^k-1$) and a binary representation of $e_i$ may then include k bits. Modular exponentiation may be performed iteratively for each segment $e_i$ to yield result R for exponent e, generator base g and modulus m. Each modular reduction is configured to reduce an intermediate result to q bits, the number of bits of modulus m.

In an embodiment consistent with the present disclosure, the generator base g may be set equal to 2 (two) and the window size k may be selected based at least in part on the architecture of the processor configured to perform the modular exponentiation. For example, for a 64-bit processor, k may be chosen to be 6, so that $b=2^k=2^6=64$, each $e_i$ ranges from zero to 63 ($2^k-1$) and each $g^{e_i}=2^{e_i}$ corresponds to one bit in a 64-bit word. Advantageously, in this embodiment exponentiation of each $e_i$ (i.e., $g^{e_i}=2^{e_i}$) may be performed using processor general purpose registers and a shift operation. The operation of calculating $2^{e_i}$ may include loading a one into a least significant bit and left shifting the one by ei. As a result, the general purpose register may contain a binary value corresponding to $2^{ei}$.

Modular multiplication may be performed in two operations as a multiplication and a modular reduction. A size of a multiplier (circuitry) may then be q×p (number of bits of modulus m by number of bits of processor). The intermediate result (result of the multiplication operation) may then be q+p bits, therefore, the modular reduction is configured to reduce the result by only p bits rather than q bits.

Accordingly, in this embodiment, by selecting the generator base to be 2 and the window size k, based at least in part on the processor architecture, segment exponentiation may be performed on the fly using a GPR and shift operations, modular multiplication may be performed using a p×q multiplier (circuitry) and modular reduction may reduce only p bits.

In another embodiment, characteristics of the modulus m may be exploited to improve efficiency. For example, in the case of a Diffie-Hellman (DH) key exchange utilizing Oakley groups and a 64-bit processor, modular reduction may be further simplified. A first and a second Oakley group may include a 768-bit prime modulus m and a 1024-bit prime modulus m2, respectively. For both m1 and m2, the sixty four most significant bits are 1. As a result, $2^{768}$ mod m1 is 768−64=704 bits and $2^{1024}$ mod m2 is 1024−64=960 bits. Utilizing these aspects of the two Oakley groups, modular reduction may be performed using a (q−64)×64 bit multiplication rather than a 64×64 multiplication and a q×64 multiplication as described herein.

In another embodiment, a Montgomery reduction may be performed more efficiently by exploiting a property of the Montgomery reduction. Montgomery reduction is typically performed to reduce (by modular reduction) a large number with respect to a modulus where the size of the number is at most twice that of the modulus. For example, reduction may be performed after a multiplication operation of two different j-bit numbers and thus consists of a product that includes 2j bits (i.e., two j-bit digits) that is to be reduced modulo a single j-bit digit modulus. A Montgomery reduction may be performed in a series of operations. A property of one of these operations (operation 3) is that the least significant j-bits of an intermediate result are all zeros. As described herein, addition of these new bits may be eliminated by determining a carry into the high j-bits of the two j-bit digits. Such an implementation is configured to improve the efficiency of the Montgomery reduction by eliminating an addition and instead checking a bit in earlier operations of the Montgomery reduction.

FIG. 1 illustrates a system 100 consistent with the various embodiments of the present disclosure. System 100 includes a host system 102 that may be coupled in a remote partner 114 over a network 112. For example, host system 102 may communicate with remote partner 114 using encryption. Host system 102 includes a processor (host CPU) 104, a system memory 106, a bridge chipset 108 and a network controller 110. The host CPU 104 may be coupled to the system memory 106 and the bridge chipset 108. The bridge chipset 108 may be coupled to the system memory 106 and the network controller 110.

The host CPU 104 includes an arithmetic logic unit ALU 120, a shifter 122, a plurality of general purpose registers (GPRs) 116, (individually RA, RB, . . . , Rm) and a multiplier 118. In some embodiments, shifter 122 may be included in ALU 120. System memory includes an operating system OS 124 and a cryptographic module 125 configured to perform cryptographic operations. For example, cryptographic module 125 may include an exponentiation module 126, a multiplication module 128, and a modular reduction module 130. The cryptographic module 125 and associated modules 126, 128, 130 are configured to perform exponentiation, multiplication and modular reduction using processor 104. For example, processor 104 may be a p-bit processor (with p-bit architecture). Thus, the general purpose registers 116 may be p-bits wide, configured to store p-bit operands.

Cryptographic operations typically include performing a modular exponentiation: $R=g^e$ mod m. Cryptographic module 125 is configured to exploit characteristics of binary arithmetic and processor architecture to increase the efficiency of the modular exponentiation. Table 1 includes pseudocode for calculating $R=g^e$ mod m, for an n-bit exponent e, a k-bit window, a $2^k$ bit base b, and a q-bit modulus m. Operations of the example of Table 1 are separated into precomputation and computation. Precomputation is configured to calculate $g_i=g^i$ for i from 1 to $2^k-1$ and $g_0=1$. Each $g_i$ may then be stored in an array of $2^k$ entries (1, g, $g^2$, . . . , $g^{2k-1}$), and utilized for the computation portion. The efficiency of the example of Table 1 depends on fast and efficient modular multiplications.

TABLE 1

Find R = $g^e$ mod m
e = $(e_t, e_{t-1}, ..., e_1, e_0)_b$ where b = $2^k$
Precomputation:
    Initialize $g_0$ = 1
    For i from 1 to $(2^k - 1)$ do:
        $g_i$ = $g_{i-1}$*g mod m = $g^i$ mod m
Computation:
    Initialize R = 1 = $R_0$
    For i from t down to zero do:
    R = $R^b$ mod m
    R = R*$g_{ei}$ mod m
Return R In an embodiment consistent with the present disclosure, for applications where the generator base g is two, the modular exponentiation may be realized more efficiently by exploiting processor architecture. In this embodiment, the precomputation may not be performed, rather each $g_{ei}=2^{ei}$ may be calculated "on the fly", during the iterative operations of the computation portion of Table 1. The window size k may be selected based at least in part on processor architecture. k may be selected such that $2^k=p$ where k is window size and p is the number of bits of the processor's general purpose registers. For example, for a 64-bit processor, k is selected to be 6. Each value of $g_{ei}$ may then fit into one processor general purpose register. The values of $g_{ei}$ may be calculated according to the pseudocode shown in Table 2.

TABLE 2

| mov rcx, [bits] | ; [bits]=$e_i$ |
| mov rax, 1 | |
| shl rax, cl | ; rax=$2^{ei}=g_{ei}$ |

For each $i^{th}$ iteration, of the computation of Table 1, as illustrated in Table 2, a segment $e_i$ of exponent e may be moved into a processor GPR (e.g., RC of GPRs 116 of processor 104), a one may be moved into register RA and the contents of RA may then be left shifted a number of times corresponding to segment $e_i$. As a result, the contents of register RA may correspond to $g_{ei}=2^{ei}$. Thus, exponentiation may be performed using shift operations and processor general purpose registers rather than a multiplication. Selecting the window size k based at least in part in the processor architecture may thereby yield an improvement in efficiency.

Selecting window size based at least in part in processor architecture may provide efficiency benefits in the modular multiplication operations in the computation portion of Table 1. $R=R*g_{ei}$ mod m (modular multiplication) may be realized in two operations: multiplication and reduction. Multiplication may be performed on q×p multiplier circuitry where q corresponds to the number of bits of the modulus m and p corresponds to processor architecture for window size k (e.g., $2^k=p$). A number of bits of the intermediate result ($R1=R*g_{ei}$) is q+p. Thus, modular reduction may reduce only p bits to achieve a desired q-bit result.

Table 3 includes pseudocode illustrating operations for calculating a result $R=g^e$ mod m, for generator base g=2, and R initialized using a most significant segment of the exponent e.

TABLE 3

Assumption: H is ten bits and L = $(e_{t-1}...e_1e_0)_b$.
Computation:
    Initialize R = $2^H$
    For i from t−1 down to 0 do:
        R = $R^b$ mod m
        R = $R*g^{ei}$ mod m
    Return R.

For generator base g=2, the initialization operation may be realized with a shift operation. R may be initialized ($R=R_0$) to a value based at least in part on modulus m and the exponent e. For example, for a 1024-bit modulus (q=1024), R may be initialized to $2^H$ where H corresponds to the most significant segment of the exponent e, i.e., the ten most significant bits of the exponent e. It may be appreciated that $0 \le 2^H < 1024$, for a 10-bit H. The number of bits, h, of H (most significant segment of e) may be selected based at least in part on q, the number of bits of modulus m. For example, h may be selected such that $2^h = q$.

Figure 2:
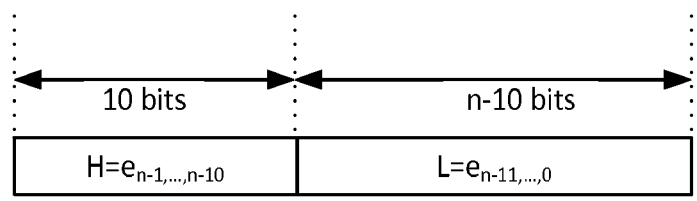
FIG. 2 is a diagram illustrating an exponent e, segmented into a ten-bit most significant segment H and a remaining segment L consistent with the present disclosure.

FIG. 2 corresponds to Table 3 and illustrates exponent e, segmented into a ten-bit most significant segment H and a remaining segment L. As shown, $H=e_{n-1,...n-10}$ where n−1 to n−10 correspond to the ten most significant bits of the exponent e, and $L=e_{n-11...0}$ where n−11 to 0 are the remaining bits of the exponent e. Thus, in terms of H and L, $e=H*2^{n-10}+L$.

The exponentiation operation to initialize $R=R_0=2^H$ corresponds to one of $2^H$ bits being set (similar to $g_{ei}=2^{ei}$ described herein). Based at least in part on this characteristic, a shift operation may be used to initialize result R. For example, for the number of bits h equal to 10 for the significant segment H of exponent e, and a 64-bit (p=64) processor, the most significant four bits of H may be used as an index for a 64-bit word corresponding to initial result R. The least significant 6 bits ($64=2^6$) of H may then be used as a shift amount corresponding to the bit to be set for $R=2^H$. Continuing with this example, (h=10 bits, q=1024 bits, p=64 bits) and assuming a 180-bit exponent e, Table 4 illustrates pseudocode for initializing $R=2^H$.

TABLE 4

| | |
|---|---|
| UINT64 R[16]=0; | //R is an array of 64-bit values, Initialize R as zero. |
| H= e>>170; | //H= most significant (10 bits) segment of exponent e. |
| R[H>>6]= 1<<(H mod 64) | // Most significant four bits of H are index, least significant 6 bits of H provide shift. |

Thus, an array of sixteen 64-bit values are initialized to zero, H is set to the most significant segment (ten most significant bits) of the 180-bit exponent e, and R is initialized to $2^H$ using the upper four bits of H as an index and the lower six bits of H as the shift amount. After initializing R, exponentiation may be performed as described herein.

For an n-bit exponent e, $H=e_t$ corresponds to the upper ten bits of the exponent and L includes the remaining n−10 bits of exponent e. Result R may be initialized as $R=2^H$ as described herein. Intermediate results may then be iteratively calculated for each segment of L ($e_{t-1}, ..., e_1, e_0$). Exponentiation ($g_{ei}=2^{ei}$) may be performed on-the-fly for each segment of L, as described herein. Modular reduction may be performed and final result $R=g^e$ mod m for g=2 and $e=H*2^{n-10}+L$ may be returned. Unlike the operations illustrated in the computation portion of Table 1, iterations are performed for i from t−1 down to zero rather than for i from t down to zero. Initializing intermediate R as described herein may therefore decrease the number of modular exponentiations.

Thus, selection of the generator base g to be two and selecting a window size k based at least in part on a target processor architecture may improve efficiency of modular exponentiation and modular multiplication in, e.g., cryptographic operations. Exponentiation may be realized using shift operations, multiplier circuitry may be simplified and initializations may be performed separately, as described herein. Accordingly, characteristics of binary arithmetic and processor architecture may be exploited to improve efficiency in these operations.

In another embodiment consistent with the present disclosure, characteristics of the modulus m may be exploited to improve efficiency in modular exponentiation and modular multiplication for cryptographic operations. For example, for generator base g equal to two, a Diffie-Hellman key exchange in Oakley Groups 1 and 2 may benefit from fewer computations to achieve modular multiplication and modular exponentiation. The efficiency of modular reduction may be improved by exploiting characteristics of Oakley Groups 1 and 2.

Table 5 includes pseudocode illustrating operations for calculating a result $R=g^e$ mod m, for generator base g=2, n-bit exponent $e=(e_te_{t-1}...e_1e_0)_b$, $b=2^k$ (where k corresponds to window size), q-bit modulus m and R initialized to a most significant segment $e_t$ of exponent e. The operations shown in Table 5 are similar to the operations shown in Table 4 with R initialized to $2^{ei}$ corresponding to the most significant segment of exponent e.

TABLE 5

Computation:
    Initialize R = $2^{et}$
    For i from t−1 down to 0 do:
        R = $R^b$ mod m
        R = $R*g^{ei}$ mod m
    Return R.

The window size k may be selected based at least in part on a processor architecture (e.g., $2^k=p$ for a p-bit processor as described herein) so that each $2^{ei}$ may fit into one general purpose register. Operation $R=R*(2^{ei})$ mod m may be performed in two operations: a multiplication and a reduction. The multiplication may be performed on a q×p multiplier as described herein. The intermediate results $R1=R*2^{ei}$ may then be q+p bits so the reduction may be configured to reduce p bits to yield a q-bit result. For k=6, p corresponds to $2^6$ or 64 bits. Thus, the reduction may be performed on the q×p (i.e., q×64) multiplier.

Efficiency of reduction of intermediate result R1 from q+64 bits to q bits may be improved by exploiting characteristics of the modulus m. For example, for a Diffie-Hellman key exchange, realized in Oakley groups, characteristics of the Oakley groups may be exploited.

For the first Oakley group, the hexadecimal value of the 768-bit prime modulus m1 is:

| | | | | |
|---|---|---|---|---|
| FFFFFFFF | FFFFFFFF | C90FDAA2 | 2168C234 | C4C6628B |
| 80DC1CD1 | 29024E08 | 8A67CC74 | 020BBEA6 | 3B139B22 |
| 514A0879 | 8E3404DD | EF9519B3 | CD3A431B | 302B0A6D |
| F25F1437 | 4FE1356D | 6D51C245 | E485B576 | 625E7EC6 |
| F44C42E9 | A63A3620 | FFFFFFFF | FFFFFFFF | |

For the second Oakley group, the hexadecimal value of the 1024-bit prime modulus m2 is:

| | | | | |
|---|---|---|---|---|
| FFFFFFFF | FFFFFFFF | C90FDAA2 | 2168C234 | C4C6628B |
| 80DC1CD1 | 29024E08 | 8A67CC74 | 020BBEA6 | 3B139B22 |
| 514A0879 | 8E3404DD | EF9519B3 | CD3A431B | 302B0A6D |
| F25F1437 | 4FE1356D | 6D51C245 | E485B576 | 625E7EC6 |
| F44C42E9 | A637ED6B | 0BFF5CB6 | F406B7ED | EE386BFB |
| 5A899FA5 | AE9F2411 | 7C4B1FE6 | 49286651 | ECE65381 |
| FFFFFFFF | FFFFFFFF | | | |

For both moduli, m1 and m2, the most significant 64 bits are 1 and the least significant 64 bits are 1. Using modular mathematics, $2^{768}$ mod m1=

| | | | | |
|---|---|---|---|---|
| 36F0255D | DE973DCB | 3B399D74 | 7F23E32E | D6FDB1F7 |
| 7598338B | FDF44159 | C4EC64DD | AEB5F786 | 71CBFB22 |
| 106AE64C | 32C5BCE4 | CFD4F592 | 0DA0EBC8 | B01ECA92 |
| 92AE3DBA | 1B7A4A89 | 9DA18139 | 0BB3BD16 | 59C81294 |
| 00000000 | 00000001 | | | | and $2^{1024}$ mod m2=

| | | | | |
|---|---|---|---|---|
| 36F0255D | DE973DCB | 3B399D74 | 7F23E32E | D6FDB1F7 |
| 7598338B | FDF44159 | C4EC64DD | AEB5F786 | 71CBFB22 |
| 106AE64C | 32C5BCE4 | CFD4F592 | 0DA0EBC8 | B01ECA92 |
| 92AE3DBA | 1B7A4A89 | 9DA18139 | 0BB3BD16 | 59C81294 |
| F400A349 | 0BF94812 | 11C79404 | A576605A | 5160DBEE |
| 83B4E019 | B6D799AE | 1319AC7E | 00000000 | 00000001 |

Thus, $2^{768}$ mod m1 includes 768−64=704 bits and $2^{1024}$ mod m2 includes 1024−64=960 bits. In other words, because the 64 most significant bits of m1 and m2 are ones, the operation $2^q$ mod m yields a result that includes q−64 bits.

Figure 3:
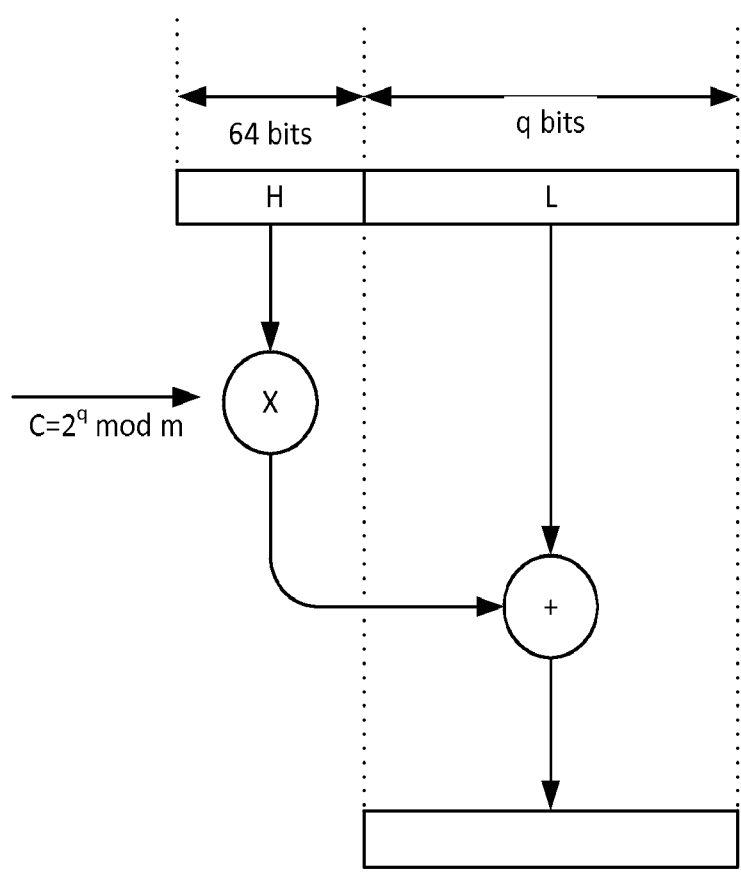
FIG. 3 is a diagram illustrating modular reduction operations configured to exploit characteristics of a modulus consistent with the present disclosure.

FIG. 3 illustrates modular reduction operations configured to exploit these characteristics of the first and second Oakley group prime moduli m1 and m2. A constant $C=2^q$ mod m (where q is the number of bits in modulus m and modulus m corresponds to Oakley group prime modulus m1 or m2) may be precomputed for the operations illustrated in Table 5. C may be calculated as an initialization (i.e., precomputed) prior to the iterative computations, shown in Table 5 as C depends only on q-bit modulus m and not on the exponent e.

Referring to Table 5 and FIG. 3, intermediate result R1=R*$(2^{ei})$ includes q+p bits where p=64 for window size k=6. Modular reduction is utilized to reduce result R to q bits. As illustrated in FIG. 3, R1 may be segmented into segment H corresponding to the p most significant bits of R*$2^{ei}$ and segment L corresponding to the remaining q bits of R*$2^{ei}$. Thus, $R1=H*2^q+L \equiv H*C+L$ mod m. The most significant p bits of R1 (HI in FIG. 3) may be multiplied by the constant C. C may include q−p bits, e.g., for moduli m1 or m2, therefore the product C*H includes (q−p)+p=q bits. Segment L includes q bits, therefore the sum of H+L may include q+1 bits. The +1 bit may be reduced by addition.

Thus, using the operations illustrated in FIG. 3 and Table 5, intermediate result R1=R*$(2^{ei})$ may be reduced by modulus m (e.g., modulus m1 or m2), using a (q−64)×64 bit multiplication rather than a 64×64 bit multiplication plus an q×64 bit multiplication. Efficiency improvements may therefore be realized in the modular reduction operations depending on characteristics of modulus m. Although this example and FIG. 3 are configured for a 64-bit processor, with appropriate choice of modulus m, the efficiency improvements in the modular reduction operation may be realized for other processor architectures.

In another embodiment, characteristics of a Montgomery reduction may be exploited to improve the efficiency of performing the Montgomery reduction. Montgomery reduction may be utilized to perform reduction of an operand with respect to a modulus where the operand is at most two times the modulus. Montgomery reduction may be performed at the bit level, word level (e.g., processor data path size (p bits)), or at a level corresponding to a size (number of bits) of the modulus. A relatively large digit may provide greater computational efficiency. A digit corresponds to j bits for a modulus base $b=2^j$. Montgomery reduction is typically performed after a multiplication operation and, thus, is configured to reduce a two digit result with respect to a single digit modulus.

Table 6 includes pseudocode corresponding to a Montgomery reduction for a multiplication result C, where C includes two j-bit digits, $c_1$ and $c_0$.

TABLE 6

| | |
|---|---|
| Input: $M = (m)_b$, $b = 2^j$, $R = 2^j$, $m' = -m^{-1}$ mod b, $C = (c_1, c_0)$ | |
| Output: Res = $C*R^{-1}$ mod M | |
| Computation | |
| Operation 1 | $T_1 = c_0 * m'$ |
| Operation 2 | $T_2 = (T_1 \bmod b) * m$ |
| Operation 3 | $T_3 = C + T_2$ |
| Operation 4 | Res = $T_3/b$ |
| Operation 5 | If Res ≥ m, then Res = Res −m. |

The operations illustrated in Table 6 are configured to perform a Montgomery reduction on the multiplication result $C=(c_1, c_0)$ with the result Res of the reduction equal to $C*R^{-1}$ mod M where M is the modulus and $R^{-1}$ is the modular multiplicative inverse of R. A characteristic of the Montgomery reduction is that the least significant j bits of intermediate result $T_3$ will be all zeros. Although the low (i.e., least significant) j bits of $T_3$ are zero, there may be a carry into the high (i.e., most significant) j bits of $T_3$. A performance improvement may be realized by determining the carry into the high j bits of intermediate result T3 without performing the addition on the lower j bits.

Whether there is a carry into the high j bits of $T_3$ depends on the lowest j bits of C (i.e., $c_0$) and the lowest j bits of $T_2$ (i.e., $T_2\_1$ where $T_2=(T_2\_h, T_2\_1)$) as illustrated by operation 3 of Table 6. As a result of operation 3, $T_3=(e_1+T_2\_h, c_0+T_2\_1)$. There are two cases to be analyzed. In the first case, if the lowest j bits of C ($c_0$) and the lowest j bits of intermediate result $T_2$ (i.e., $T_2\_1$) are zero, then there will be no carry into the high j bits of $T_3$. In the second case, if the lowest j bits of C or the lowest j bits of $T_2$ are not all zero there will be a carry into the high j bits of $T_3$. Because the lower j bits of $T_3$ are zero for a Montgomery reduction, a carry will occur only if the lowest j bits of C or the lowest j bits of $T_2$ are not all zero.

Figure 4:
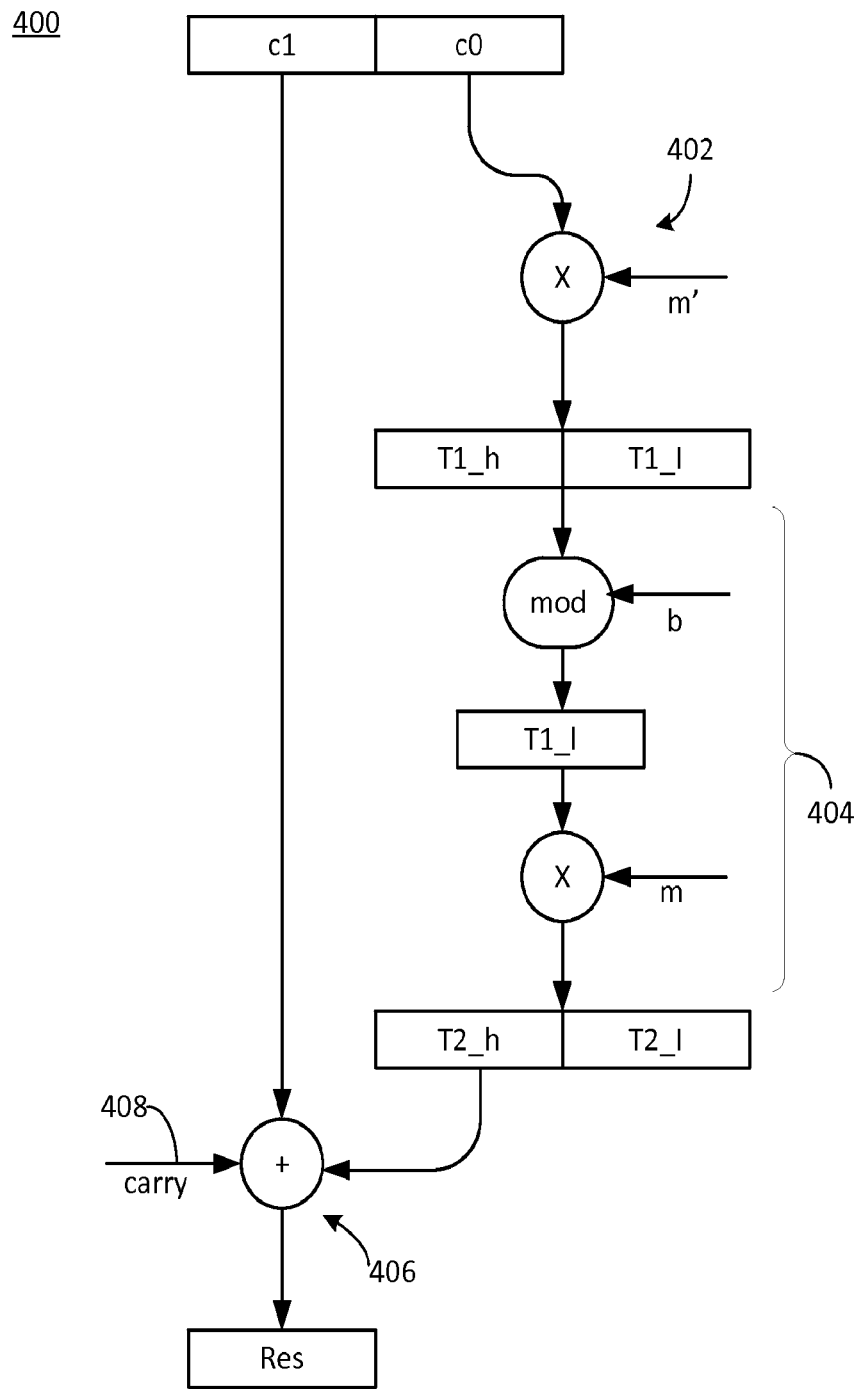
FIG. 4 is a diagram illustrating a modified Montgomery reduction consistent with the present disclosure.

The two cases may be distinguished using conditional branches. However, branches are typically avoided because they can result in a data-dependent operation time that may be used in a side-channel attack. The two cases may be distinguished without using conditional branches by analyzing a most significant bit of the lowest j bits of C and the most significant bit of $T_2$. Table 7 and FIG. 4 illustrate one example configured to analyze the most significant bits of the lowest j bits of C and $T_2$, respectively. Table 7 includes pseudocode corresponding to a Montgomery reduction, modified consistent with the present disclosure.

TABLE 7

Input: $M = (m)_b$, $b = 2^j$, $R = 2^j$, $m' = -m^{-1}$ mod b, $C = (c_1, c_0)$
Output: Res = $C*R^{-1}$ mod M
Computation
Operation 1     $T_1 = c_0 * m'$
Operation 2     $T_2 = (T_1$ mod b$) * m$
Operation 3     carry = $((j-1)^{th}$ bit of C$)$ or $((j-1)^{th}$ bit of $T_2)$
Operation 4     Res = $(c_1) + (T_2 >> j) +$ carry
Operation 5     If Res ≥ m, then Res = Res −m.

Operation 3 of Table 7 is configured to determine whether there is a carry into the high j bits of $T_3$. If either the most significant bit of $c_0$ or the most significant bit of $T_{2\_1}$ is not zero, then there is a carry. Analyzing these two bits may be sufficient since the lower j bits of $T_3$ are zero as a characteristic of the Montgomery reduction. For example, if both the $(j-1)^{th}$ bit of C and the $(j-1)^{th}$ bit of $T_2$ are zero, all of the other bits in $c_0$ and $T_{2\_1}$ must be zero for the low bits of T3 to be zero. If either the $(j-1)^{th}$ bit of C or the $(j-1)^{th}$ bit of T2 is nonzero, then there must be a carry for the $(j-1)^{th}$ bit of $T_3$ to be zero.

Operation 4 of Table 7 is configured to add the carry to the high j bits of $T_2$ ($T_{2\_h}$) and to the high j bits of C ($c_1$). Although operation 4 includes a right shift by j bits, the right shift function may be realized by adjusting a pointer. For example, if j is a multiple of processor word size, a pointer adjustment may be equivalent to the right shift by j bits corresponding to operation 4.

FIG. 4 illustrates the operations in a modified Montgomery reduction using a carry determined according to the operations shown in Table 7. Section 402 corresponds to Operation 1 of Table 7, section 404 corresponds to Operation 2. Section 406 corresponds to Operation 4 of Table 7 using carry 408 determined at Operation 3.

Thus, the efficiency of a Montgomery reduction may be improved by exploiting the characteristic that the low j bits of the intermediate result $T_3$ are necessarily zero. A j-bit addition may then be avoided by analyzing two bits and adding a carry depending on the result of the analysis.

FIG. 5 is a flowchart 500 illustrating operations consistent with the various embodiments of the present disclosure. Operations of flowchart 500 may begin with receiving a request 502 to determine a modular exponentiation result R=$g^e$ mod m. Operation 504 may include segmenting the n-bit exponent e into a first segment $e_t$ and a number t of k-bit segments $e_i$ in response to the request. R is a modular exponentiation of generator base g for the exponent e and a q-bit modulus m. The generator base g may equal two and k may be based at least in part on a processor configured to determine the result R. Operation 506 may include iteratively calculating a respective intermediate modular exponentiation result for each segment $e_i$. The calculating may include multiplication, exponentiation and a modular reduction of at least one of a multiplication result and an exponentiation result, as described herein. A result R=$g^e$ mod m may be returned at operation 508 and program flow may end.

While FIG. 5 illustrates various operations according an embodiment, it is to be understood that not all of the operations depicted in FIG. 5 are necessary for other embodiments. Indeed, it is fully contemplated herein that in other embodiments of the present disclosure, the operations depicted in FIG. 5 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Any of the operations described herein may be implemented in a system that includes one or more storage mediums having stored thereon, individually or in combination, instructions that when executed by one or more processors perform the methods. Here, the processor may include, for example, a system CPU, network controller, and/or other programmable circuitry. Also, it is intended that operations described herein may be distributed across a plurality of physical devices, such as processing structures at different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

Network 112 may comprise a packet switched network. Network controller 110 may be capable of communicating with the remote partner 114 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard. Alternative or additionally, network controller 110 may be capable of communicating with one or more devices, e.g., link partner 120, using an X.25 communications protocol. The X.25 communications protocol may comply or be compatible with a standard promulgated by the International Telecommunication Union-Telecommunication Standardization Sector (ITU-T). Alternatively or additionally, network controller 110 may be capable of communicating with one or more devices, e.g., remote partner 114, using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, network controller 110 may be capable of communicating with one or more devices, e.g., remote partner 114, using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed connection-oriented network communication protocols are equally contemplated herein.

"Circuitry", as used in any embodiment herein, may comprise, for example, singly or in any combination, hardwired circuitry, programmable circuitry, state machine circuitry, and/or firmware that stores instructions executed by programmable circuitry. A "manager", as used in any embodiment herein, may be embodied as circuitry. The circuitry may be embodied as an integrated circuit, such as an integrated circuit chip. It should be noted that the buffer 114 may be embodied as data structures stored in a storage medium, as defined above.

Thus, the present disclosure provides techniques configured to improve efficiency in modular exponentiation and modular multiplication operations on a p-bit processor that may be useful in cryptographic operations. The techniques are configured to exploit both processor architecture and properties of binary arithmetic operations to improve efficiency of modular exponentiation and modular multiplication. Using these techniques allows determining a result $R=g^e$ mod m with, for example, simpler operations (shifting versus multiplying) and simpler multipliers (q×p versus q×q). Initializations may be performed, (e.g., $R=2^H$) to reduce the computational intensity of the iterative operations. By careful selection of the modulus m, improvements in multiplier size and operations for modular reduction may be realized. Modular reduction using the Montgomery reduction may also be simplified by checking two bits in an intermediate result. Each technique is configured to contribute to increased efficiency in multiplication, exponentiation and modular reduction in determining the result R.

According to another aspect there is provided a method. The method may include segmenting an n-bit exponent e into a first segment $e_t$ and a number t of k-bit segments $e_i$ in response to a request to determine a modular exponentiation result R, wherein R is a modular exponentiation of a generator base g for the exponent e and a q-bit modulus m, wherein the generator base g equals two and k is based at least in part on a processor configured to determine the result R; iteratively calculating a respective intermediate modular exponentiation result for each segment $e_i$, wherein the calculating comprises multiplication, exponentiation and a modular reduction of at least one of a multiplication result and an exponentiation result; and returning the modulation exponentiation result $R=g^e$ mod m.

According to another aspect there is provided a host system. The host system may include a system memory, the system memory configured to store a cryptographic module; and a p-bit processor comprising a plurality of p-bit registers. The processor is configured to segment an n-bit exponent e into a first segment $e_t$ and a number t of k-bit segments $e_i$ in response to a request to determine a modular exponentiation result R, wherein R is a modular exponentiation of a generator base g for exponent e and a q-bit modulus m, wherein the generator base g equals two and k is based at least in part on the processor; iteratively calculate a respective intermediate modular exponentiation result for each segment $e_i$, wherein the calculating comprises multiplication, exponentiation and a modular reduction of at least one of a multiplication result and an exponentiation result; and return the modulation exponentiation result $R=g^e$ mod m.

According to another aspect there is provided a system. The system may include one or more storage mediums having stored thereon, individually or in combination, instructions that when executed by one or more processors result in the following operations comprising:

segmenting an n-bit exponent e into a first segment $e_t$ and a number t of k-bit segments $e_i$ in response to a request to determine a modular exponentiation result R, wherein R is a modular exponentiation of a generator base g for the exponent e and a q-bit modulus m, wherein the generator base g equals two and k is based at least in part on a processor configured to determine the result R; iteratively calculating a respective intermediate modular exponentiation result for each segment $e_i$, wherein the calculating comprises multiplication, exponentiation and a modular reduction of at least one of a multiplication result and an exponentiation result; and returning the modulation exponentiation result $R=g^e$ mod m.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method, comprising:
    segmenting an n-bit exponent e into a first segment $e_t$ and a number t of k-bit segments $e_i$ in response to a request to determine a modular exponentiation result R, wherein R is a modular exponentiation of a generator base g for the exponent e and a q-bit modulus m, wherein the generator base g equals two and k is based at least in part on a processor configured to determine the result R;
    iteratively determining a respective intermediate modular exponentiation result for each segment $e_i$, wherein the determining comprises multiplication, exponentiation and a modular reduction of at least one of a multiplication result and an exponentiation result; and
    generating the modular exponentiation result $R=g^e$ mod m based on, at least in part, at least one respective intermediate modular exponentiation result.

2. The method of claim 1, further comprising selecting k such that $2^k=p$ wherein the processor is a p-bit processor comprising a plurality of p-bit registers.

3. The method of claim 2, wherein an intermediate exponentiation result is determined using shift operations on an operand stored in one of the plurality of p-bit registers.

4. The method of claim 1, further comprising determining an initial result $R_0$ based at least in part on the first segment $e_t$, wherein $R_0$ equals $g^{e_t}$.

5. The method of claim 1, further comprising determining a constant C based on the modulus m, wherein a number of most significant bits of the q-bit modulus m is one and C is configured to reduce the intermediate multiplication result.

6. The method of claim 5 wherein the modulus is one of the first or second Oakley group prime moduli.

7. The method of claim 1, further comprising performing a Montgomery reduction on an intermediate multiplication result comprising determining whether an operation in the Montgomery reduction results in a carry from a low order operand to a corresponding high order operand.

8. The method of claim 1, wherein the multiplication is configured to be performed on a q×p multiplier.

9. A host system comprising:
    a system memory, the system memory configured to store a cryptographic module; and
    a p-bit processor comprising a plurality of p-bit registers, wherein the processor is configured to execute the cryptographic module to perform the following operations:
        segment an n-bit exponent e into a first segment $e_t$ and a number t of k-bit segments $e_i$ in response to a request to determine a modular exponentiation result R, wherein R is a modular exponentiation of a generator base g for exponent e and a q-bit modulus m, wherein the generator base g equals two and k is based at least in part on the processor;

iteratively determine a respective intermediate modular exponentiation result for each segment $e_i$, wherein the determining comprises multiplication, exponentiation and a modular reduction of at least one of a multiplication result and an exponentiation result; and return the modulation exponentiation result $R=g^e \bmod m$ based on, at least in part, at least one respective intermediate modular exponentiation result.

10. The host system of claim 9, wherein the processor is further configured to select k such that $2^k=p$, wherein the processor is a p-bit processor comprising a plurality of p-bit registers.

11. The host system of claim 9, wherein the processor is further configured to determine an initial result $R_0$ based at least in part on the first segment $e_f$, wherein $R_0$ equals $g^{e_f}$.

12. The host system of claim 9, wherein the processor is further configured to determine a constant C based on the modulus m, wherein a number of most significant bits of the q-bit modulus m is one and C is configured to reduce the intermediate multiplication result.

13. The host system of claim 12 wherein the modulus is one of the first or second Oakley group prime moduli.

14. The host system of claim 9, wherein the processor is further configured to perform a Montgomery reduction on an intermediate multiplication result comprising determining whether an operation in the Montgomery reduction results in a carry from a low order operand to a corresponding high order operand.

15. The host system of claim 9, further comprising a q×p multiplier wherein the multiplication is configured to be performed on a q×p multiplier.

16. A system comprising one or more storage mediums having stored thereon, individually or in combination, instructions that when executed by one or more processors result in the following operations comprising:

segmenting an n-bit exponent e into a first segment $e_f$ and a number t of k-bit segments $e_i$ in response to a request to determine a modular exponentiation result R, wherein R is a modular exponentiation of a generator base g for exponent e and a q-bit modulus m, wherein the generator base g equals two and k is based at least in part on a processor configured to determine the result R;

iteratively determining a respective intermediate modular exponentiation result for each segment $e_i$, wherein the determining comprises multiplication, exponentiation and a modular reduction of at least one of a multiplication result and an exponentiation result; and returning the modulation exponentiation result $R=g^e \bmod m$ based on, at least in part, at least one respective intermediate modular exponentiation result.

17. The system of claim 16, wherein the instructions that when executed by one or more processors results in the following additional operations:

selecting k such that $2^k=p$ wherein at least one processor is a p-bit processor comprising a plurality of p-bit registers.

18. The system of claim 16, wherein the instructions that when executed by one or more processors results in the following additional operations:

determining an initial result $R_0$ based at least in part on the first segment $e_f$, wherein $R_0$ equals $g^{e_f}$.

19. The system of claim 16, wherein the instructions that when executed by one or more processors results in the following additional operations:

determining a constant C based on the modulus m, wherein a number of most significant bits of the q-bit modulus m is one and C is configured to reduce the intermediate multiplication result.

20. The system of claim 16, wherein the instructions that when executed by one or more processors results in the following additional operations:

performing a Montgomery reduction on an intermediate multiplication result comprising determining whether an operation in the Montgomery reduction results in a carry from a low order operand to a corresponding high order operand.

* * * * *